United States Patent
Deaton et al.

(10) Patent No.: US 9,653,898 B1
(45) Date of Patent: May 16, 2017

(54) ELECTRICAL OUTLET FACEPLATE WITH ELECTRICAL CORD CLEAT

(71) Applicants: Will Deaton, Corpus Christi, TX (US); Charles Zeller, Corpus Christi, TX (US)

(72) Inventors: Will Deaton, Corpus Christi, TX (US); Charles Zeller, Corpus Christi, TX (US)

(*) Notice: Subject to any disclaimer, the term of this patent is extended or adjusted under 35 U.S.C. 154(b) by 0 days.

(21) Appl. No.: 15/096,581

(22) Filed: Apr. 12, 2016

(51) Int. Cl.
*H02G 3/08* (2006.01)
*H01R 25/00* (2006.01)
*H01R 24/76* (2011.01)
*H01R 24/28* (2011.01)

(52) U.S. Cl.
CPC ........... *H02G 3/083* (2013.01); *H01R 24/28* (2013.01); *H01R 24/76* (2013.01); *H01R 25/006* (2013.01)

(58) Field of Classification Search
USPC ........................................... 174/66
See application file for complete search history.

(56) References Cited

U.S. PATENT DOCUMENTS

| | | | |
|---|---|---|---|
| 2,438,143 A | 9/1948 | Rosenblum | |
| 3,257,497 A | 6/1966 | Chase | |
| 5,011,427 A | 4/1991 | Martin | |
| D325,564 S | 4/1992 | Lemke | |
| 5,547,390 A | 8/1996 | Laherty | |
| 6,519,208 B2* | 2/2003 | DeVries | G04G 15/00 174/50 |
| 7,255,588 B2 | 8/2007 | Wilder | |
| 7,378,591 B2* | 5/2008 | Dinh | H02G 3/086 174/50 |
| 7,462,777 B2* | 12/2008 | Dinh | H01R 13/5213 174/58 |
| 9,203,222 B2* | 12/2015 | Korcz | H02G 3/088 |

* cited by examiner

*Primary Examiner* — Dhirubhai R Patel
(74) *Attorney, Agent, or Firm* — Kyle A. Fletcher, Esq.

(57) ABSTRACT

The electrical outlet faceplate with electrical cord cleat is a cleat plate that is for use with an electrical outlet faceplate. The cleat plate is a structure around which a cable can be secured such that the cable will not be disconnected or damaged inadvertently. The electrical outlet faceplate with electrical cord cleat is attached by a hinge to the electrical outlet faceplate allowing the cleat plate to be rotated to a position perpendicular to the electrical face plate while the cleat plate is in use and allowing the cleat plate to be rotated to a closed position flush to the electrical outlet faceplate when the cleat plate is not in use. The electrical outlet faceplate with electrical cord cleat includes an outlet faceplate, a cleat plate, and a hinge.

18 Claims, 6 Drawing Sheets

ELECTRICAL OUTLET FACEPLATE WITH ELECTRICAL CORD CLEAT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of pipes and fittings for electrical cables, more specifically, a cleat adapted for use with an electrically conductive cable.

SUMMARY OF INVENTION

The electrical outlet faceplate with electrical cord cleat is a cleat plate that is adapted for use with an electrical outlet faceplate. In this disclosure, the term cleat is used in a nautical sense (as opposed to a footwear sense). The cleat plate is a structure around which a cable can be secured such that the cable will not be disconnected or damaged inadvertently. The electrical outlet faceplate with electrical cord cleat is attached by a hinge to the electrical outlet faceplate allowing the cleat plate to be rotated to a position perpendicular to the electrical face plate while the cleat plate is in use and allowing the cleat plate to be rotated to a closed position flush to the electrical outlet faceplate when the cleat plate is not in use.

These together with additional objects, features and advantages of the electrical outlet faceplate with electrical cord cleat will be readily apparent to those of ordinary skill in the art upon reading the following detailed description of the presently preferred, but nonetheless illustrative, embodiments when taken in conjunction with the accompanying drawings.

In this respect, before explaining the current embodiments of the electrical outlet faceplate with electrical cord cleat in detail, it is to be understood that the electrical outlet faceplate with electrical cord cleat is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the electrical outlet faceplate with electrical cord cleat.

It is therefore important that the claims be regarded as including such equivalent construction insofar as they do not depart from the spirit and scope of the electrical outlet faceplate with electrical cord cleat. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 9.

The electrical outlet faceplate with electrical cord cleat 100 (hereinafter invention) comprises an outlet faceplate 101, a cleat plate 102, and a hinge 103.

The invention 100 is a combination of a cleat plate 102 and an outlet faceplate 101 that is adapted for use with an NEMA 5-electrical socket 131. The cleat plate 102 is a structure around which a cable 136 can be secured such that the cable 136 will not be disconnected or damaged inadvertently. The cleat plate 102 is attached by a hinge 103 to the outlet faceplate 101 allowing the cleat plate 102 to be rotated to a position perpendicular to the outlet faceplate 101 while the cleat plate 102 is in use and allowing the cleat plate 102 to be rotated to a closed position 118 flush to the outlet faceplate 101 when the cleat plate 102 is not in use.

The outlet faceplate 101 is a faceplate that is designed to be mounted over a first NEMA 5-15 electrical socket 131. As shown most clearly in FIG. 1, the outlet faceplate 101 further comprises a first panel 110, a first aperture 111, a second aperture 112, a third aperture 113, a latch 114, and a ridge 115. The first panel 110 is a rectangular plate that is formed with a first ridge 115 and is further defined with a first perimeter 116. The first ridge 115 is a structure formed along the first perimeter 116 of the first panel 110. The first ridge 115 structure curves away from the main planar surface of the first panel 110 to the first perimeter 116. The purpose of the first ridge 115 is to set the first panel 110 away from the wall to accommodate the projection of a first NEMA 5-15 electrical socket 131 beyond the surface of the wall. The first panel 110 has formed in it a first aperture 111, a second aperture 112, and a third aperture 113.

Figure 1:
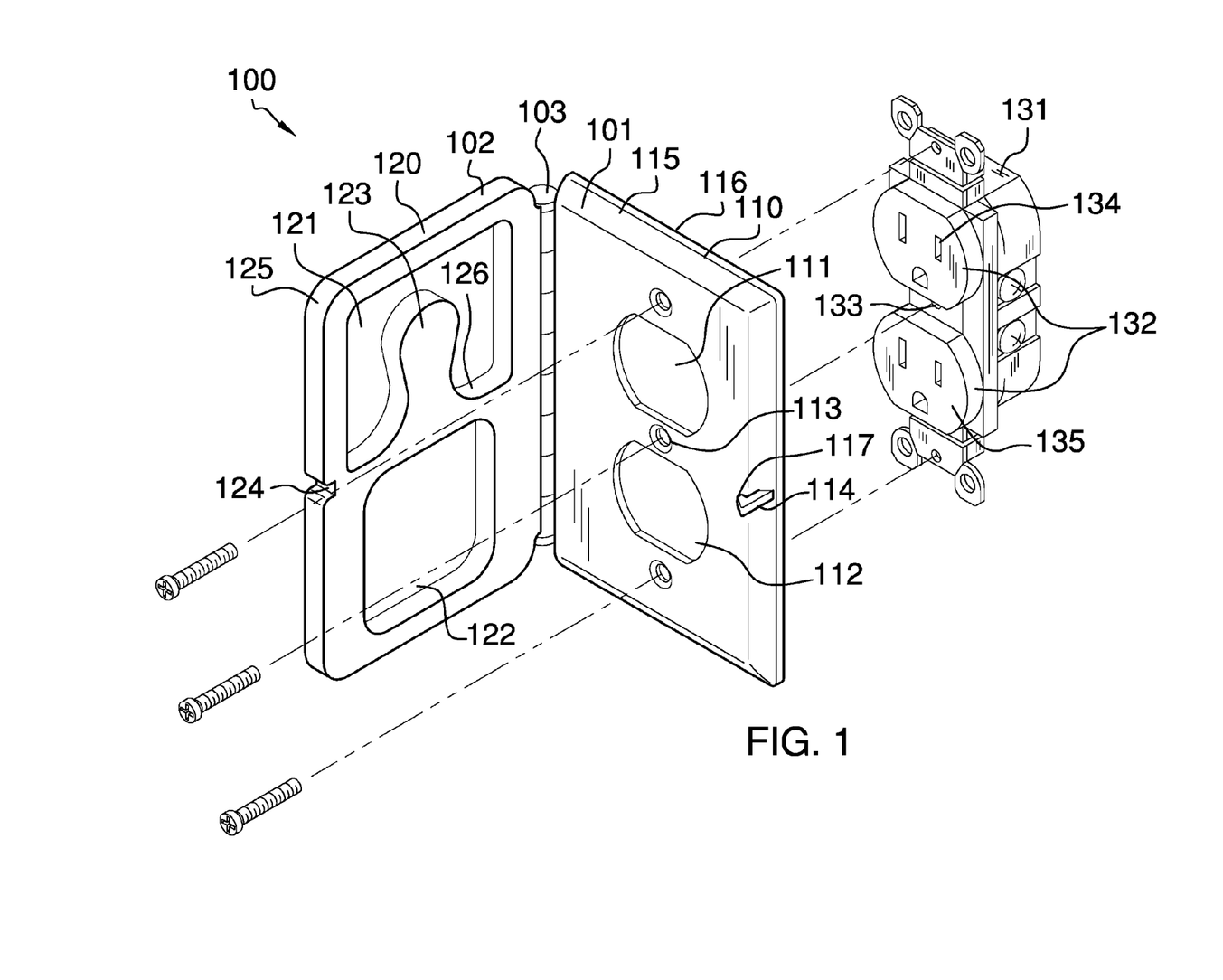
FIG. 1 is a perspective view of an embodiment of the disclosure.
Figure 2:
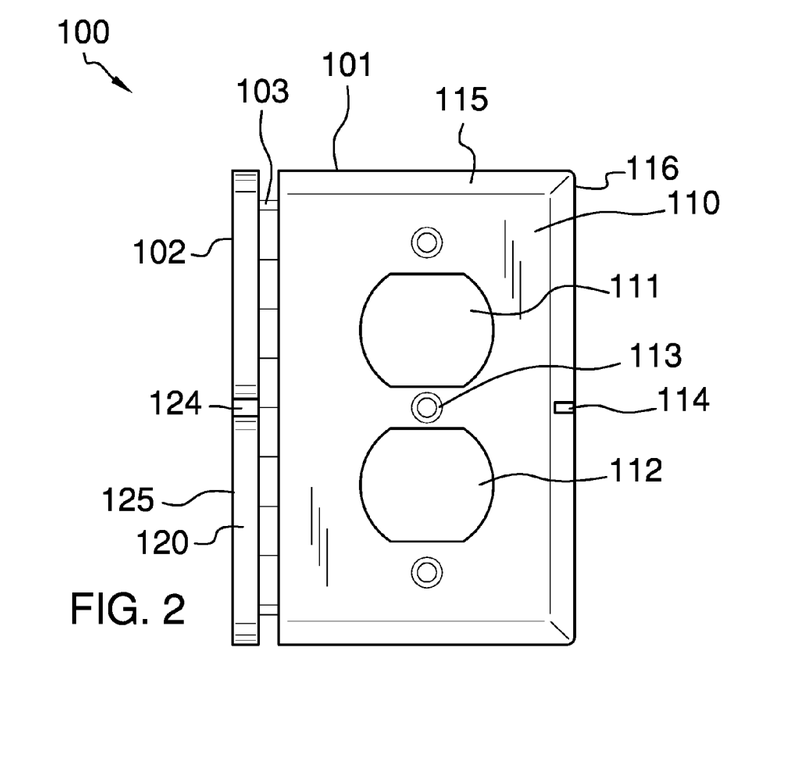
FIG. 2 is a front view of an embodiment of the disclosure.
Figure 3:
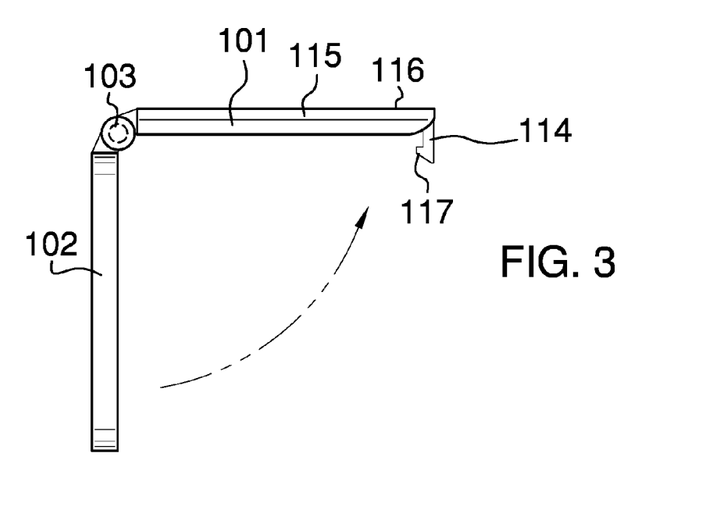
FIG. 3 is a side view of an embodiment of the disclosure.
Figure 4:
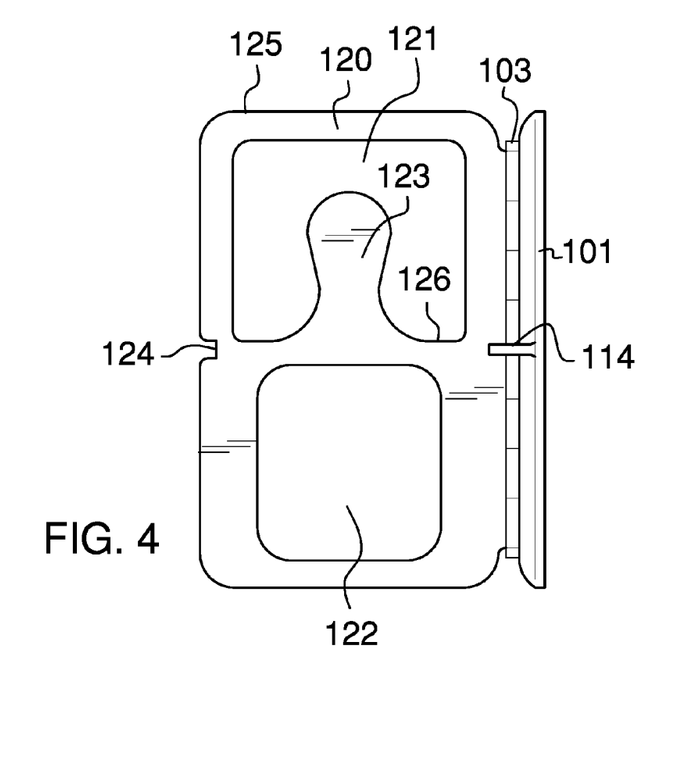
FIG. 4 is a top view of an embodiment of the disclosure.
Figure 5:
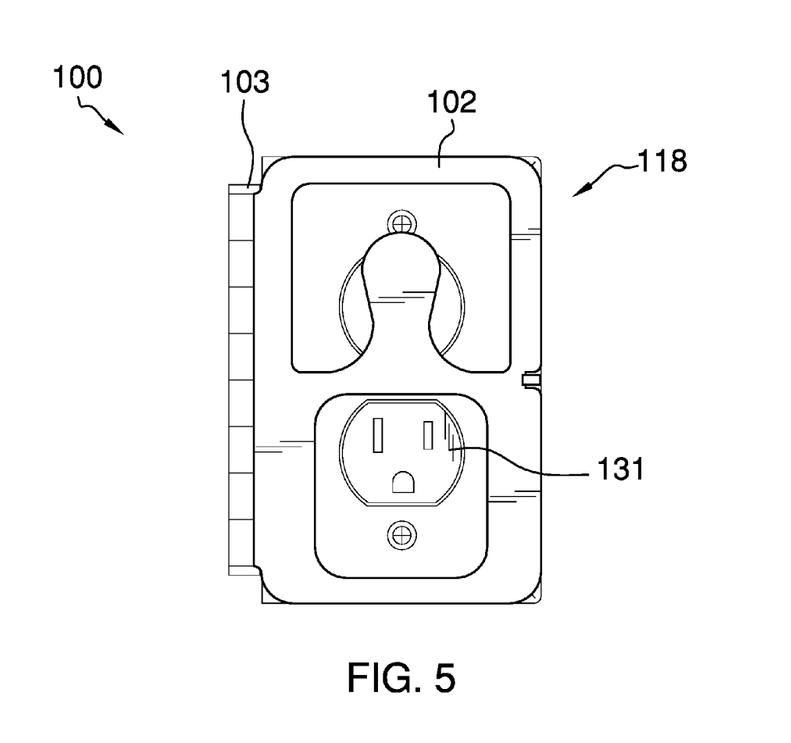
FIG. 5 is a detail view of an embodiment of the disclosure.

As shown most clearly in FIG. 1, the third aperture 113 is an opening that is formed within the first panel 110 through which a first bolt is inserted to attach the first panel 110 to the plate hole 133 associated with the first NEMA 5-15 electrical socket 131. The first aperture 111 is an opening that is formed in the first panel 110 such that a first electric port 134 selected from a plurality of electric ports 132 associated with the first NEMA 5-15 electrical socket 131 will fit within the first aperture 111 such that the first electric port 134 can be accessed through the first aperture 111. The second aperture 112 is an opening that is formed in the first panel 110 such that a second electric port 135 selected from a plurality of electric ports 132 associated with the first NEMA 5-15 electrical socket 131 will fit within the second aperture 112 such that the second electric port 135 can be accessed through the second aperture 112. The location of the first aperture 111 and the second aperture 112 relative to the third aperture 113 is standardized within the electrical equipment industry.

The latch 114 is a cylindrical structure that projects perpendicularly away from the outlet faceplate 101 in a direction away from the NEMA 5-15 electrical socket 131. In the first potential embodiment of the disclosure, the latch 114 further comprises a hook 117 which is located on the end of the latch 114 that is distal from the NEMA 5-15 electrical socket 131.

In a second potential embodiment of the disclosure, the first panel 110 further comprises a sixth aperture, a seventh aperture and an eighth aperture. The eighth aperture is an opening that is formed within the first panel 110 through which a second bolt is inserted to attach the first panel 110 to the plate hole 133 associated with a second NEMA 5-15 electrical socket 131 that is ganged with the first NEMA 5-15 electrical socket 131. The sixth aperture is an opening that is formed in the first panel 110 such that a first electric port 134 selected from a plurality of electric ports 132 associated with the second NEMA 5-15 electrical socket 131 will fit within the sixth aperture such that the first electric port 134 can be accessed through the sixth aperture. The seventh aperture is an opening that is formed in the first panel 110 such that a second electric port 135 selected from a plurality of electric ports 132 associated with the second NEMA 5-15 electrical socket 131 will fit within the seventh aperture such that the second electric port 135 can be accessed through the seventh aperture. The location of the sixth aperture and the seventh aperture relative to the eighth aperture is standardized within the electrical equipment industry.

The cleat plate 102 comprises a second panel 120, a fourth aperture 121, a fifth aperture 122, one or more horns 123, and a latch notch 124. The second panel 120 is a rectangular plate that is further defined with a second perimeter 125. The dimensions of the second panel 120 are sized such that the second panel 120 will fit over and cover the first panel 110. As shown most clearly in FIG. 1, the second panel 120 has formed in it the fourth aperture 121 and the fifth aperture 122. The fourth aperture 121 is an opening formed in the second panel 120. The fifth aperture 122 is an opening formed in the second panel 120. The fourth aperture 121 has further formed in it one or more horns 123. Each of the one or more horns 123 is a cantilever structure that projects into the open area of the fourth aperture 121 from the edge 126 that bounds the fourth aperture 121. Each of the one or more horns 123 is used to secure a cable 136.

Figure 6:
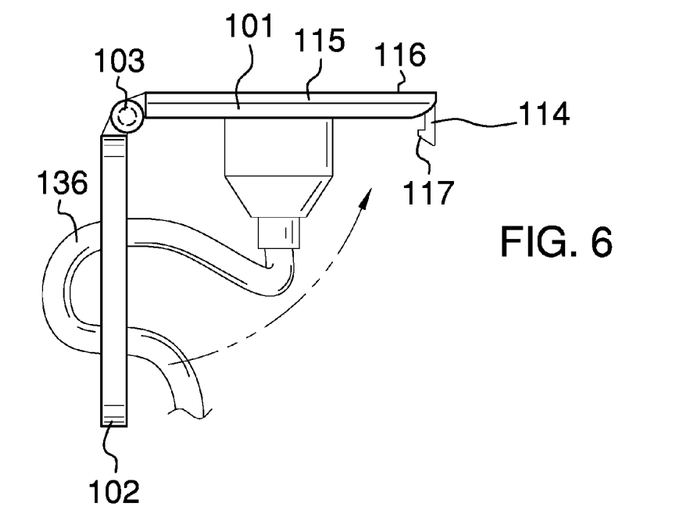
FIG. 6 is an in use view of an embodiment of the disclosure.
Figure 7:
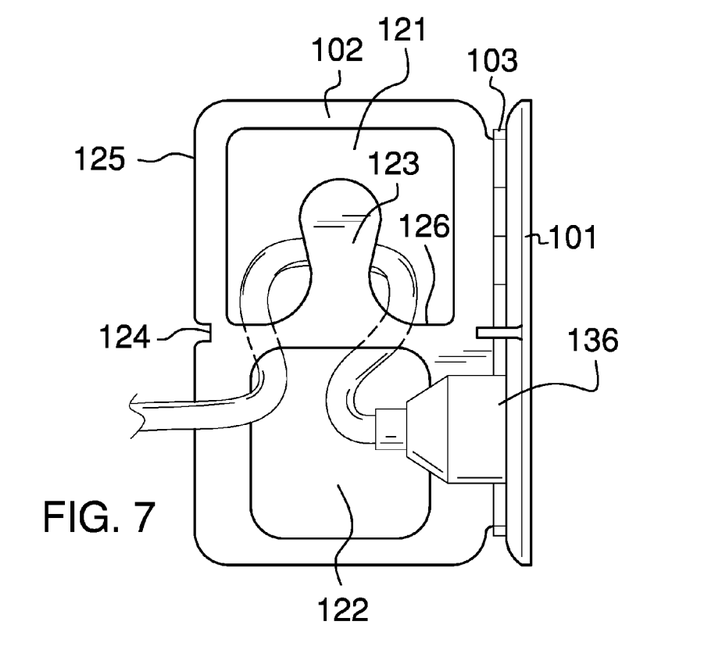
FIG. 7 is an in use view of an embodiment of the disclosure.
Figure 8:
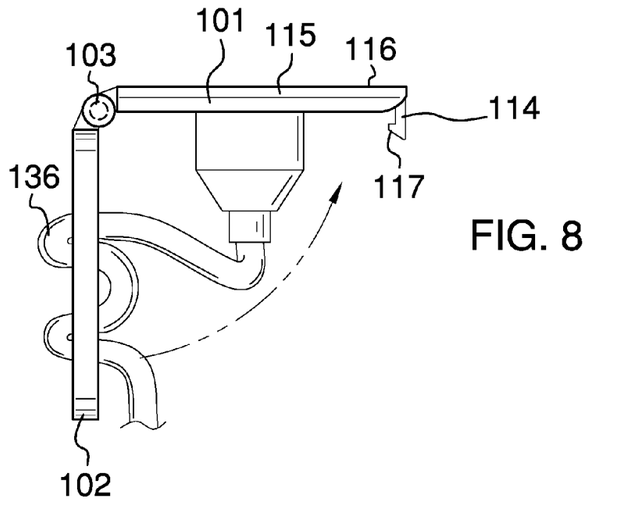
FIG. 8 is an in use view of an embodiment of the disclosure.
Figure 9:
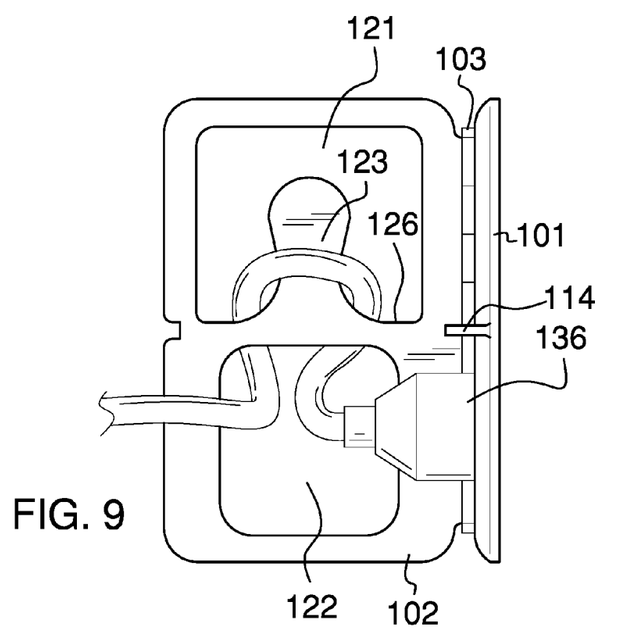
FIG. 9 is an in use view of an embodiment of the disclosure.

In a normal scenario, as shown in FIGS. 6 and 7, the cable 136 is secured to a horn selected from the one or more horns 123 by bending the cable 136, inserting the bent cable 136 through the fourth aperture 121 and draping the bent portion of the cable 136 around a horn selected from the one or more horns 123. When a more secure attachment is required, as shown in FIGS. 8 and 9, the cable 136 is first bent. The bent portion of the cable 136 is then inserted through the fifth aperture 122 and then inserted through the fourth aperture 121 from the opposite direction. From this position, the bent portion of the cable 136 is draped around a horn selected from the one or more horns 123. This additional routing more securely attaches the cable 136 to the cleat plate 102.

The second panel 120 has further formed in it a latch notch 124. As shown most clearly in FIGS. 1 and 4, the latch notch 124 is a groove that is formed in the second perimeter 125. The latch notch 124 is positioned such that when the cleat plate 102 is placed in its closed position 118 the latch 114 fits into the latch notch 124. The latch 114 and the latch notch 124 are designed to interact such that this interaction will hold the cleat plate 102 in the closed position 118 during storage. Methods to design mechanical latches or detents in the manner described in this paragraph are well known and documented in the mechanical arts.

The cleat plate 102 is attached to the outlet faceplate 101 using the hinge 103. The hinge 103 is a commercially available hinge that is attached such that the cleat plate 102 will rotate towards and away from the outlet faceplate 101 using the hinge 103 as a pivot.

In the first potential embodiment of the disclosure and the second potential embodiment of the disclosure, the outlet faceplate 101 and the cleat plate 102 are molded as separate items. The hinge 103 that connects the outlet faceplate 101 and the cleat plate 102 are purchased separately. Suitable materials for molding the outlet faceplate 101 and the cleat plate 102 include, but is not limited to, polyethylene, polyvinylchloride, aluminum, zinc, or clay that is later fired to form a ceramic.

The following definitions were used in this disclosure:

Cable: As used in this disclosure, a cable is a collection of insulated wires covered by a protective casing that is used for conducting electricity.

Cantilever: As used in this disclosure, a cantilever is a beam or other structure that projects away from an object and is supported on only one end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; or, 4) the point, pivot, or axis around which something revolves.

Cleat: As used in this disclosure, a cleat is an object around which a rope, cord, or wire can be secured.

Detent: As used in this disclosure, a detent is a device for positioning and holding one mechanical part in relation to another in a manner such that the device can be released by force applied to one or more of the parts.

Hinge: As used in this disclosure, a hinge is a device that permits the turning, rotating, or pivoting of a first object relative to a second object.

NEMA 5-15 Electrical Socket: As used in this disclosure, the NEMA 5-15 electrical socket is a port designed to provide electric power drawn from the National Electric Grid. The NEMA 5-15 electrical socket is commonly used to deliver electrical power to electric devices in residential, office, and light industrial settings. The typical NEMA 5-15 electrical socket comprises a plurality of electric ports from which electric power is drawn. The position of each of the plurality of electric ports is placed in a standardized position. The typical NEMA 5-15 electrical socket further comprises a plate hole which is a standardized hole located in a standardized position within the NEMA 5-15 electrical socket that that is designed to receive a bolt that is used to attach a faceplate to the NEMA 5-15 electrical socket. The NEMA 5-15 electrical socket is also commonly referred to as an electrical outlet.

Outlet: As used in this disclosure, an outlet is a device placed in the electrical wiring system of a building where electrical current can be taken to run electrical devices. In this disclosure an outlet is a socket adapted to receive a plug.

Perimeter: As used in this disclosure, a perimeter is one or more curved or straight lines that bounds an enclosed area on a plane or surface. The perimeter of a circle is commonly referred to as a circumference.

Pivot: As used in this disclosure, a pivot is a rod or shaft around which an object rotates or swings.

Plug: As used in this disclosure, a plug is a device at the end of an electrical cord that connects a cable to an electrical device or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Ridge: As used in this disclosure, a ridge is an elevated or raised portion of a structure.

With respect to the above description, it is to be realized that the optimum dimensional relationship for the various components of the invention described above and in FIGS. 1 through 9, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventors claim:

1. A cleat comprising:
an outlet faceplate, a cleat plate, and a hinge;
wherein the cleat is adapted for use with at least one electrical socket;
wherein the cleat is adapted for use with a cable;
wherein the cleat plate is a structure around which the cable is adapted to be secured;
wherein the cleat plate is attached by said hinge to the outlet faceplate;
wherein the cleat plate rotates from a position perpendicular to the outlet faceplate to a closed position that is flush to the outlet faceplate;
wherein the cleat plate comprises a second panel, a first aperture, a second aperture, one or more horns, and a latch notch;
wherein the second panel is a rectangular plate that is further defined with a second perimeter;
wherein the dimensions of the second panel are sized such that the second panel will fit over and cover the first panel.

2. The cleat according to claim 1
wherein the first aperture is an opening formed in the second panel;
wherein the second aperture is an opening formed in the second panel.

3. The cleat according to claim 2
wherein the first aperture has further formed in it one or more horns;
wherein each of the one or more horns is a cantilever structure.

4. The cleat according to claim 3
wherein the cantilever structure projects into the open area of the first aperture from an edge that bounds the first aperture.

5. The cleat according to claim 4
wherein each of the one or more horns is used to secure a cable;
wherein the cable is secured to a horn selected from the one or more horns by bending the cable, inserting the bent cable through the first aperture and draping the bent portion of the cable around a horn selected from the one or more horns.

6. The cleat according to claim 5 wherein the outlet faceplate attaches to a first electrical socket of the at least one electrical socket.

7. The cleat according to claim 6 wherein the latch is a cylindrical structure that projects perpendicularly away from the outlet faceplate in a direction away from the first electrical socket.

8. The cleat according to claim 7 wherein the latch further comprises a hook that is located on the end of the latch that is distal from the first electrical socket.

9. The cleat according to claim 8
wherein the latch notch is a groove that is formed in the second perimeter;
wherein the latch notch is positioned such that when the cleat plate is placed in its closed position the latch fits into the latch notch.

10. The cleat according to claim 9
wherein the outlet faceplate comprises a first panel;
wherein the first panel further comprises a first aperture and a second aperture;
wherein the first aperture is an opening that is formed in the first panel such that a first electric port selected from a plurality of electric ports associated with the first electrical socket will fit within the first aperture such that the first electric port can be accessed through the first aperture;
wherein the second aperture is an opening that is formed in the first panel such that a second electric port selected from a plurality of electric ports associated with the first electrical socket will fit within the second aperture such that the second electric port can be accessed through the second aperture;
wherein the first panel further comprises a third aperture;
wherein the third aperture is an opening that is formed within the first panel and which is used to attach the first panel to the plate hole associated with the first electrical socket.

11. The cleat according to claim 10
wherein the first panel further comprises a sixth aperture, a seventh aperture and an eighth aperture;

wherein the eighth aperture is an opening that is formed within the first panel which a second bolt is used to attach the first panel to a second electrical socket that is ganged with the first electrical socket;

wherein the sixth aperture is an opening that is formed in the first panel such that a first electric port selected from a plurality of electric ports associated with the second electrical socket will fit within the sixth aperture such that the first electric port can be accessed through the sixth aperture.

12. The cleat according to claim 4
wherein each of the one or more horns is used to secure a cable;
wherein the cable is bent and the bent portion of the cable is inserted through the second aperture and then inserted through the first aperture from the opposite direction and draped around a horn selected from the one or more horns.

13. The cleat according to claim 12 wherein the outlet faceplate attaches to a first electrical socket.

14. The cleat according to claim 13 wherein the latch is a cylindrical structure that projects perpendicularly away from the outlet faceplate in a direction away from the at least one electrical socket.

15. The cleat according to claim 14 wherein the latch further comprises a hook that is located on the end of the latch that is distal from the at least one electrical socket.

16. The cleat according to claim 15
wherein the latch notch is a groove that is formed in the second perimeter;
wherein the latch notch is positioned such that when the cleat plate is placed in its closed position the latch fits into the latch notch.

17. The cleat according to claim 16
wherein the outlet faceplate comprises a first panel;
wherein the first panel further comprises a first aperture and a second aperture;
wherein the first aperture is an opening that is formed in the first panel such that a first electric port selected from a plurality of electric ports associated with the first electrical socket will fit within the first aperture such that the first electric port can be accessed through the first aperture;
wherein the second aperture is an opening that is formed in the first panel such that a second electric port selected from a plurality of electric ports associated with the first electrical socket will fit within the second aperture such that the second electric port can be accessed through the second aperture;
wherein the first panel further comprises a third aperture;
wherein the third aperture is an opening that is formed within the first panel and which is used to attach the first panel to the plate hole associated with the first electrical socket.

18. The cleat according to claim 17
wherein the first panel further comprises a sixth aperture, a seventh aperture and an eighth aperture;
wherein the eighth aperture is an opening that is formed within the first panel which a second bolt is used to attach the first panel to a second electrical socket that is ganged with the first electrical socket;
wherein the sixth aperture is an opening that is formed in the first panel such that a first electric port selected from a plurality of electric ports associated with the second electrical socket will fit within the sixth aperture such that the first electric port can be accessed through the sixth aperture;
wherein the seventh aperture is an opening that is formed in the first panel such that a second electric port selected from a plurality of electric ports associated with the second electrical socket will fit within the seventh aperture such that the second electric port can be accessed through the seventh aperture.

* * * * *